(12) United States Patent
Usui et al.

(10) Patent No.: US 10,727,546 B2
(45) Date of Patent: Jul. 28, 2020

(54) METHOD FOR TREATING LITHIUM ION BATTERY

(71) Applicant: JX NIPPON MINING & METALS CORPORATION, Tokyo (JP)

(72) Inventors: Shojiro Usui, Hitachi (JP); Nobuaki Okajima, Hitachi (JP)

(73) Assignee: JX NIPPON MINING & METALS CORPORATION, Tokyo (JP)

( * ) Notice: Subject to any disclaimer, the term of this patent is extended or adjusted under 35 U.S.C. 154(b) by 152 days.

(21) Appl. No.: 15/566,814

(22) PCT Filed: Apr. 15, 2016

(86) PCT No.: PCT/JP2016/062153
§ 371 (c)(1),
(2) Date: Oct. 16, 2017

(87) PCT Pub. No.: WO2016/167359
PCT Pub. Date: Oct. 20, 2016

(65) Prior Publication Data
US 2018/0083325 A1 Mar. 22, 2018

(30) Foreign Application Priority Data

Apr. 17, 2015 (JP) ................. 2015-085432

(51) Int. Cl.
*H01M 10/54* (2006.01)
*C22B 7/00* (2006.01)
(Continued)

(52) U.S. Cl.
CPC ............ *H01M 10/54* (2013.01); *C22B 1/005* (2013.01); *C22B 7/00* (2013.01); *C22B 7/001* (2013.01);
(Continued)

(58) Field of Classification Search
CPC ...................................................... H01M 10/54
See application file for complete search history.

(56) References Cited

U.S. PATENT DOCUMENTS

2002/0124691 A1* 9/2002 Tateiwa ................. C22B 7/005
75/714
2009/0314134 A1 12/2009 Iida
(Continued)

FOREIGN PATENT DOCUMENTS

CN 102263235 A 11/2011
CN 103443996 A 12/2013
(Continued)

OTHER PUBLICATIONS

JPH 1046266—machine translation (year-2010).*
(Continued)

*Primary Examiner* — Nathaniel Herzfeld
(74) *Attorney, Agent, or Firm* — Birch, Stewart, Kolasch & Birch, LLP

(57) ABSTRACT

The present invention provides a method for treating at least one lithium ion battery enclosed in a housing containing aluminum, comprising heating the lithium ion battery using a combustion furnace in which a combustion object is incinerated by flames, while preventing the flames from being directly applied to the housing of the lithium ion battery.

13 Claims, 6 Drawing Sheets

(51) Int. Cl.
    *C22B 26/12*     (2006.01)
    *C22B 21/00*     (2006.01)
    *C22B 1/00*     (2006.01)
    *C22B 23/02*     (2006.01)
    *H01M 10/0525*     (2010.01)

(52) U.S. Cl.
    CPC .......... *C22B 7/005* (2013.01); *C22B 21/0023* (2013.01); *C22B 23/021* (2013.01); *C22B 26/12* (2013.01); *H01M 10/0525* (2013.01); *Y02P 10/214* (2015.11); *Y02P 10/234* (2015.11); *Y02W 30/84* (2015.05)

(56) References Cited

U.S. PATENT DOCUMENTS

| | | | | |
|---|---|---|---|---|
| 2013/0323142 | A1* | 12/2013 | Shimano | H01M 4/0471 423/49 |
| 2014/0017621 | A1 | 1/2014 | Iida et al. | |
| 2014/0102256 | A1* | 4/2014 | Mori | C22B 1/005 75/414 |
| 2014/0318313 | A1* | 10/2014 | Takahashi | C22B 7/001 75/10.53 |

FOREIGN PATENT DOCUMENTS

| | | |
|---|---|---|
| JP | 10-46266 A | 2/1998 |
| JP | 11-242967 A | 9/1999 |
| JP | 2001/115218 A | 4/2001 |
| JP | 2001-283871 A | 10/2001 |
| JP | 2010-3512 A | 1/2010 |
| JP | 2687614 A1 | 1/2014 |
| JP | 2014-227565 A | 12/2014 |
| JP | 2016-22395 A | 2/2016 |

OTHER PUBLICATIONS

International Search Report, issued in PCT/JP2016/062153, dated Jun. 21, 2016.
Written Opinion of the International Searching Authority, issued in PCT/JP2016/062153, dated Jun. 21, 2016.
Extended European Search Report, dated Oct. 2, 2018, for European Application No. 16780150.5.
English translation of International Preliminary Report on Patentability and Written Opinion of the International Searching Authority (Forms PCT/IB/338, PCT/IB/373 and PCT/ISA/237) dated Oct. 26, 2017, for International Application No. PCT/JP2016/062153.

* cited by examiner

[FIG. 1]
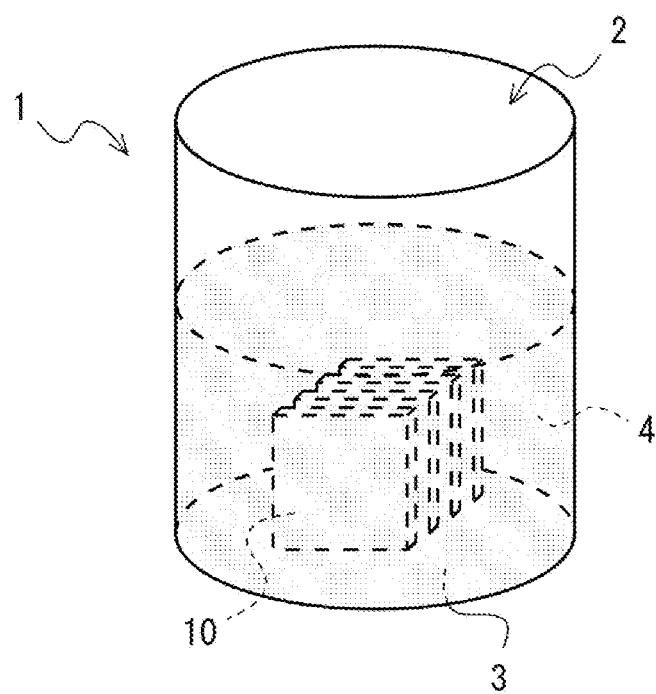

[FIG. 2]
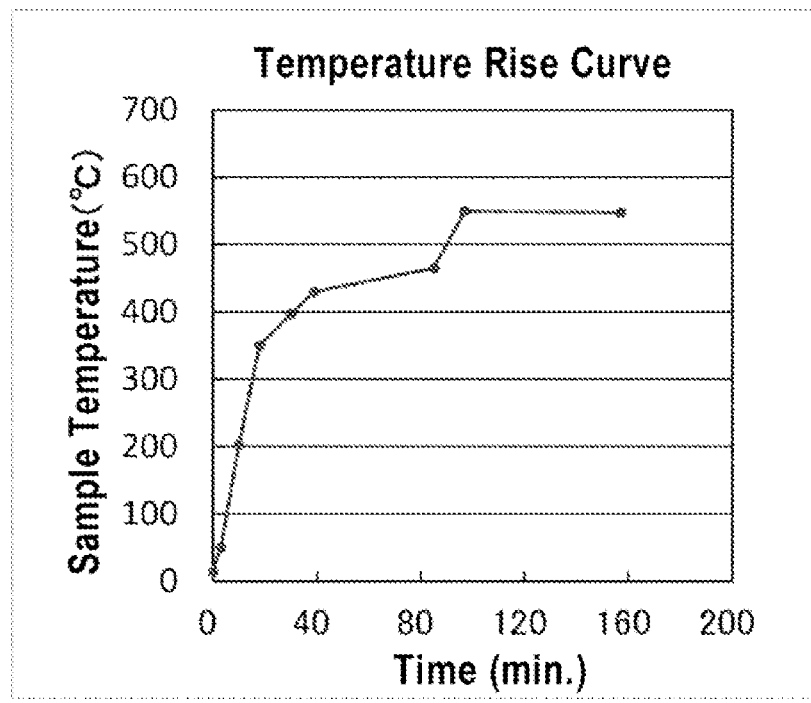

[FIG. 3]
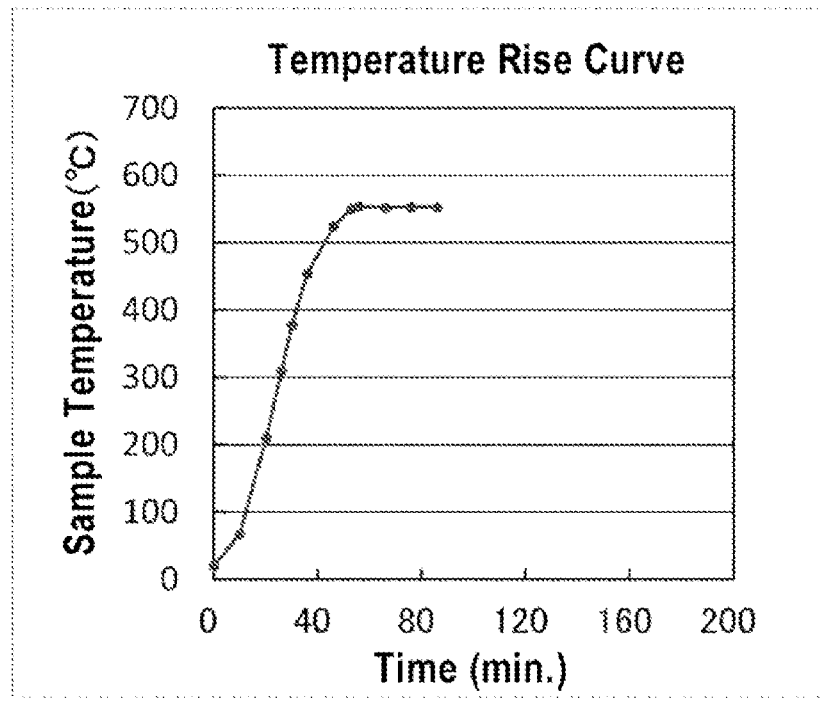

[FIG. 4]
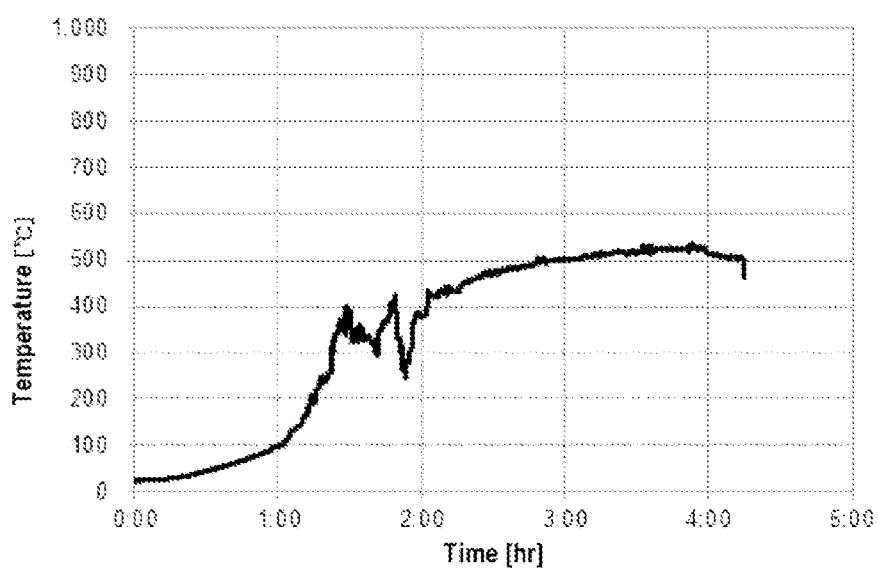

[FIG. 5]
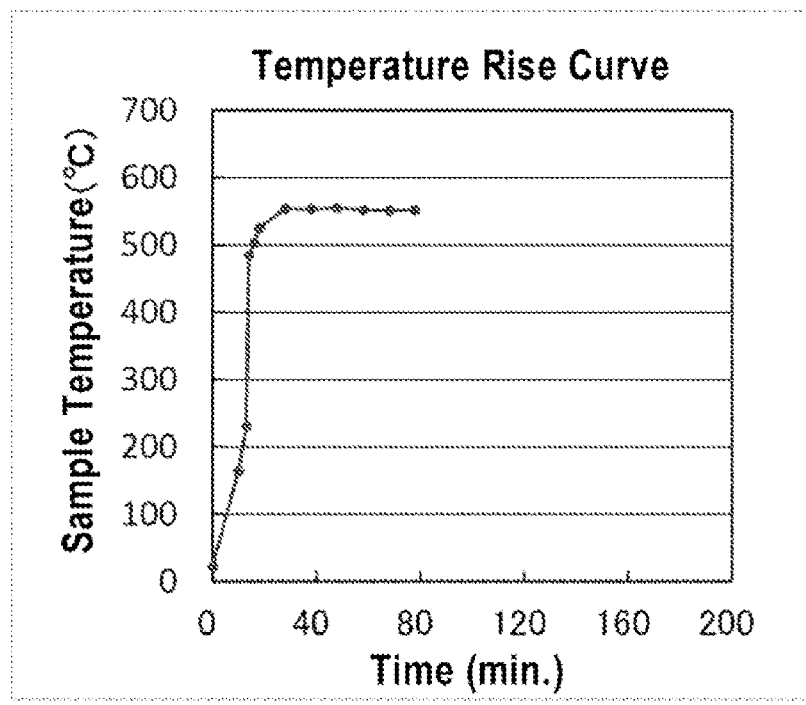

[FIG. 6]
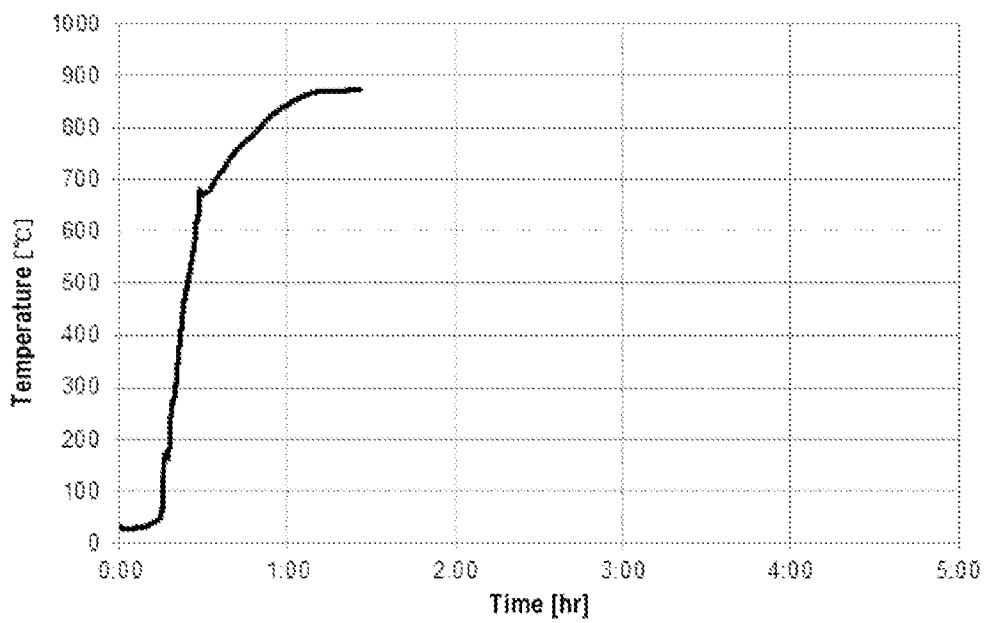

METHOD FOR TREATING LITHIUM ION BATTERY

TECHNICAL FIELD

The present invention relates to a method for treating at least one lithium ion battery surrounded by a housing containing aluminum by heating the lithium ion battery. More particularly, the present invention proposes to a technique that can prevent embrittlement of the housing around the lithium ion battery when carrying out the heat treatment and contribute to removal of aluminum from the lithium ion battery.

BACKGROUND ART

Lithium ion batteries used in various industrial fields including various electronic devices use a lithium metal salt containing manganese, nickel and cobalt as a positive electrode active material. The lithium ion batteries are formed by enclosing circumferences of a positive electrode material containing the positive electrode active material and a negative electrode material in a housing containing aluminum. Recently, with an increased amount of lithium ion batteries to be used and expansion of the range of use, an amount of the lithium ion batteries to be discarded has been increased due to product life of the batteries and defects in the manufacturing processes.

Under such circumstances, there is a need for easily recovering expensive elements such as nickel and cobalt as stated above from a large amount of discarded lithium ion battery scrap with a relatively low cost in order to reuse the elements.

In order to treat the lithium ion batteries such as the lithium ion battery scrap for recovering the valuable metals, a preliminary step is firstly carried out by roasting the lithium ion batteries to remove a harmful electrolytic solution contained therein so as to render the lithium ion batteries harmless, and then sequentially crushing and sieving the lithium ion batteries to remove a certain degree of aluminum contained in the housing and the positive electrode base material.

A leaching step is then carried out by leaching the powdered positive electrode material obtained in the previous step with an acid, and dissolving lithium, nickel, cobalt, manganese, aluminum and the like that may be contained therein in the solution to obtain a leached solution.

Subsequently, a recovery step is carried out to separate each metal element being dissolved in the leached solution. In this case, the leached solution is sequentially subjected to a plurality of stages of solvent extraction or neutralization depending on the metals to be separated and each solution obtained in each stage is subjected to stripping, electrolysis, carbonization or other treatments, in order to separate each metal being dissolved in the leached solution. More particularly, each valuable metal can be recovered by firstly recovering aluminum, then manganese, then cobalt, and then nickel, and finally leaving lithium in the aqueous phase.

SUMMARY OF INVENTION

Technical Problem

As described above, when the roasting of the lithium ion batteries before leaching the lithium ion batteries with an acid is carrying out by heating the lithium ion batteries to directly exposing them to flames using a combustion furnace in which a combustion object is incinerated by the flames, the housings forming the exterior of the lithium ion batteries, aluminum foils and copper foils present therein are oxidized and embrittled. As a result, the housings containing aluminum, the aluminum foils and the copper foils contained therein will be easily crushed during subsequent crushing of the lithium ion batteries. In this case, it is difficult to remove the crushed housings, aluminum foils and copper foils by sieving them so as to leave them on the sieve, so that a large amount of the crushed matters will be mixed into the powdered positive electrode materials recovered below the sieve, and a large amount of aluminum will be contained in the leached solution when leaching the positive electrode materials with an acid. Consequently, there has been a problem that a man-hour for separation and removal of aluminum is required in the recovery step, so that costs are increased.

An object of the present invention is to solve such problems, and to provide a method for treating at least one lithium ion battery, which can effectively prevent oxidation and embrittlement of a housing, an aluminum foil, and a copper foil upon a heating treatment of the lithium ion battery.

Solution to Problem

As a result of intensive studies, the present inventors have found that by directly applying flames to at least one lithium ion battery in a combustion furnace, the temperature of the sample is rapidly elevated to result in oxidation and embrittlement of the housing and rupture of the housing, or result in oxidation and embrittlement of the aluminum foil and the copper foil contained inside the housing even if the housing is not raptured, so that these foils are easily pulverized by subsequent crushing.

Therefore, the present inventors have considered that by heating the lithium ion battery in the combustion furnace so as to not directly apply the housing to the flames, the housing is not ruptured or the oxidation and embrittlement of the housing, aluminum foil and copper foil are suppressed, so that the lithium ion battery can be effectively heated.

Based on the above findings, the present invention provides a method for treating at least one lithium ion battery enclosed in a housing containing aluminum, comprising heating the lithium ion battery using a combustion furnace in which a combustion object is incinerated by flames, while preventing the flames from being directly applied to the housing of the lithium ion battery.

In the method for treating the lithium ion battery according to the present invention, a temperature of the lithium ion battery in the combustion furnace may be increased in an air atmosphere.

Here, specifically, in the combustion furnace, the lithium ion battery may be disposed in a battery protection container for preventing the flames from being directly applied to the housing of the lithium ion battery, and the flames may be applied to an outer surface of the battery protection container.

The battery protection container may preferably have at least one gas venting hole for discharging a gas flowing out from the inside of the housing of the lithium ion battery to the outside of the battery protection container.

In the battery protection container a filling material may be arranged together with the lithium ion battery.

The filling material may be in the form of powder, particularly alumina powder.

In the battery protection container, the entire lithium ion battery may preferably be embedded in the filling material.

At least one heat insulating material may preferably be provided on at least one position on the outer surface of the battery protection container, which position is applied to the flames.

After heating the lithium ion battery, the lithium ion battery may preferably maintain the state where the lithium ion battery is enclosed in the housing.

Advantageous Effects of Invention

According to the method for treating the lithium ion battery of the present invention, oxidation of the housing can be suppressed by heating the lithium ion battery while preventing the flames from being directly applied to the housing of the lithium ion battery, so that rupture of the housing and oxidation/embrittlement of the housing, aluminum foil and copper foil can be effectively prevented.

BRIEF DESCRIPTION OF DRAWINGS

FIG. 1 is a perspective oblique view schematically showing an example of a battery protection container that can be employed in one embodiment of the present invention in a state where the lithium ion battery has been disposed within the container.

FIG. 2 is a graph showing a change in a sample temperature in a heating step of Example 1 as a function of time.

FIG. 3 is a graph showing a change in a sample temperature in a heating step of Example 2 as a function of time.

FIG. 4 is a graph showing a change in a sample temperature in a heating step of Example 3 as a function of time.

FIG. 5 is a graph showing a change in a sample temperature in a heating step of Comparative Example 1 as a function of time.

FIG. 6 is a graph showing a change in a sample temperature in a heating step of Comparative Example 2 as a function of time.

DESCRIPTION OF EMBODIMENTS

Embodiments of the present invention will be described in detail below.

In the method for treating the lithium ion battery according to one embodiment of the invention, at least one lithium ion battery enclosed in the housing containing aluminum is targeted, and the lithium ion battery is heated using a combustion furnace in which a combustion object is incinerated by flames, while preventing the flames from being directly applied to the housing of the lithium ion battery.

(Lithium Ion Battery)

The lithium ion battery targeted by the present invention may be any lithium ion battery used for mobile phones or various other electronic devices, provided that the housing enclosing the lithium ion battery contains aluminum. Particularly, so-called lithium ion battery scrap discarded due to battery life, manufacturing defects or other reasons may be preferably targeted in terms of effective utilization of resources.

Examples of the housing of the lithium ion battery include those made of only aluminum, and those comprising aluminum and iron, or aluminum laminate, and the like.

In addition, the lithium ion battery may contain, in the above housing, a positive electrode active material composed of one or more single metal oxides selected from lithium, nickel, cobalt, and manganese, or two or more composite metal oxides or the like, or an aluminum foil (a positive electrode base material) to which the positive electrode active material is applied and fixed by an organic binder or the like. Additionally, the lithium ion battery may contain copper, iron or the like. Additionally, the lithium ion battery may contain copper, iron and the like.

Further, the lithium ion battery generally contains an electrolyte solution in the housing. As the electrolytic solution, ethylene carbonate, diethyl carbonate or the like may be used for example.

The lithium ion battery enclosed in the housing can have a substantially square or rectangular planar contour shape, in which case, the lithium ion battery may have, for example, a length of from 40 mm to 80 mm, a width of 35 mm to 65 mm, a thickness of 4 mm to 5 mm as dimensions before the treatment, but not limited to those dimensions.

(Heating Step)

In the heating step, it is advantageous to use an ordinary combustion furnace in which a combustion object is incinerated by flames, because the furnace can suppress an increase in equipment costs as compared with a case of using any special equipment. However, if the flames are directly applied to the housing of the lithium ion battery having the housing as described above in such a combustion furnace to heat the lithium ion battery, the housing, the aluminum foil and the copper foil will become oxidized and embrittled. In this case, when the lithium ion battery is crushed after the heating step, the embrittled housing and foils also tend to be finely pulverized, so that a large amount of aluminum contained in the housing and the like is mixed into the powdered positive electrode material recovered below the sieve. This will increase the work and costs for subsequent recovery of aluminum.

In order to address this problem, the present invention heats the lithium ion battery while preventing the flames from being directly applied to the lithium ion battery. For example, the lithium ion battery can be arranged away from the flames by a certain distance.

Here, as a suitable example of the approach for preventing flames from being directly applied to the lithium ion battery in the combustion furnace, the lithium ion batteries 10 may be placed in a battery protection container 1 as illustrated in FIG. 1 and the lithium ion batteries 10 can be heated by applying the flames to the outer surface of the battery protection container 1.

In this case, the battery protection container 1 functions to prevent the flames from being applied to the housings disposed within the lithium ion batteries 10 while transmitting heat from the flames to the lithium ion batteries at a predetermined temperature. Therefore, it is possible to prevent a rapid temperature rise of the housings of the lithium ion batteries and also prevent oxidation of the housings and the foils, thereby effectively roasting the lithium ion batteries. As a result, a state where the periphery of the lithium ion battery is enclosed in the housing until the end of the heating step, thereby easily and reliably achieving prevention of granulation of the housing and the foils during the crushing and sieving steps to remove them on the sieve.

When the lithium ion battery 10 is heated, the electrolytic solution contained therein is vaporized and the gas flows out from the inside of the housing. Therefore, the battery protection container 1 as described above preferably has at least one gas venting hole 2 for discharging the gas flowing out from the housing of the lithium ion battery 10 to the outside of the container.

Specifically, the battery protection container 1 may have an opening as the gas venting hole 2 and may be a cylindrical container with a bottom 3. In this case, the inner and outer contour shapes of the cross-section of the cylindrical container can have various shapes such as a circular shape, an oval shape, an elliptical shape or other circular shape, or a quadrangular or other polygonal shape, as shown in the drawing. In addition, at least a position where the flames are applied, of the battery protection container 1 may preferably be a wall surface that does not have a void such as a through hole, in order to prevent direct application of the flames to the housings of the lithium ion batteries 10 by the battery protection container 1.

Materials for forming the battery protection container 1 include, but not limited to, for example, stainless steel, carbon steel and the like. They can be heat-resistant materials which can be proof against direct application of the flames of the combustion furnace.

Further, a filling material 4 may be disposed together with the lithium ion batteries in the battery protection container 1. The filling material 4 allows uniform conductivity of heat from the battery protection container 1 to the lithium ion batteries 10, so that it is possible to more reliably maintain uniform heat transfer throughout the lithium ion batteries 10.

The filling material 4 includes various ceramic powders, sand and the like. In particular, it may be in the form of powder as shown in the figure, in terms of uniform heating of the lithium ion batteries 10.

When the filling material 4 is in the form of powder, the filling material may particularly preferably be alumina powder. This is because the alumina powder is stable against heat and has an effect of shielding air since it is powder, and the alumina powder is not dissolved as an impurity in a leached solution when acid-leaching valuable metals including the positive electrode material recovered by crushing/sieving and the like after the heat treatment.

Such a filling material 4 in the form of powder prevents oxygen from reaching the periphery of the lithium ion batteries 10 from which a gas flows out from the housings, so that the filling material also functions to more effectively prevent oxidation of the housings during heating. Therefore, in this case, the oxidation of the housings can be effectively prevented even if the inside of the combustion furnace is in an air atmosphere, so that any special equipment for changing the atmosphere in the combustion furnace is not required. The oxidation of the housing can be prevented by decreasing the size of the gas venting hole 2 in the battery protection container 1 to such an extent that a large amount of oxygen due to discharging of the gas flowing out from the housing can be prevented from flowing into the battery protection container 1. As shown in FIG. 1, the entire lithium ion batteries 10 may be preferably embedded in the filling material 4, in terms of thermal conductivity and prevention of oxidation.

Regardless of whether or not the filling material 4 is used, heat conduction to each lithium ion battery can be uniformed by partitioning the interior of the battery protection container into small spaces in which, for example, individual lithium ion batteries can be arranged, so that uniform combustion of the lithium ion batteries can be achieved, although not shown.

A shielding plate or other heat insulating material consisting of a metal plate, a ceramic plate or the like can be disposed at a position on the outer surface of the battery protection container, to which position the flames are applied, although not shown. The insulating material can contribute to uniform heat conduction to the lithium ion batteries by preventing a local temperature rise at the position of the battery protection container, to which position the flames are applied.

Such a heating step can prevent oxidation of the housing of the lithium ion battery even in the air atmosphere in a certain furnace such as the combustion furnace, so that the heating step is advantageous in that equipment and the like for producing an atmosphere in which the housing is not oxidized is not required.

In the heating step, the temperature of the lithium ion batteries is firstly raised, and subsequently, from the time when the temperature reaches within a range of 200° C. to 400° C., and preferably 220° C. to 380° C., the low temperature range can be maintained for 10 minutes or more, and more preferably for 20 minutes or more, for example.

(Leaching Step and Recovery Step)

After the heating step as described above, crushing and sieving may be carried out as required, thereby obtaining a sieved product containing the positive electrode material in the form of granule or powder from which aluminum has been sufficiently removed. The sieved product in the form of granule or powder containing the positive electrode material is then added to an acidic solution such as sulfuric acid to leach the sieved product to obtain a leached solution, and nickel, cobalt, manganese and the like dissolved in the leached solution is recovered. Specifically, for example, by means of solvent extraction or neutralization, manganese is first separated and recovered, and then cobalt, followed by nickel, are separated and recovered, and finally lithium is left in the aqueous phase.

Here, because of the heating step described above, substantially no aluminum will be included in the metals dissolved in the leached solution, so that treatments required for separating and removing aluminum in the recovery step can be simplified or omitted. This can achieve improvement of processing efficiency and reduction of processing costs.

EXAMPLES

The treating method of the present invention was experimentally conducted and its effects were confirmed as described below. However, the description herein is merely for the purpose of illustration and is not intended to be limited thereto.

Example 1

Lithium ion batteries each having an Al housing were heated in a crucible furnace in an air atmosphere. The lithium ion batteries were placed in the alumina crucible furnace and heated so as to prevent heat from wires of an electric heater of the crucible furnace from being directly applied to the lithium ion batteries. Further, output of the heater was adjusted such that the sample temperature was not sharply increased, and the sample was heated to 550° C. FIG. 2 graphically shows a history of the sample temperature. For the lithium ion batteries after the heating treatment, expansion of the Al housings was observed, but their original shapes were maintained without rupture of the housings or the like. The lithium ion batteries after the heating treatment were crushed with a crusher, and then sieved with a sieve having openings of 1 mm to recover positive electrode materials and the like below the sieve. The sieved product (<1 mm) had a Co content of 37%, an Al content of 4.5%, and a Cu content of 0.7%, and had a Co recovery rate of 98%. The analytical values and the recovery rates of the sieved product are shown in Table 1.

It should be noted that the recovery rate as used herein means a weight percentage of an amount of each metal in the sieved product (<1 mm) to the total amount of respective metals for the whole products, in which the amount of the metal for each component is calculated from a weight of each sieved product collected by crushing and sieving the heat-treated lithium ion batteries and contents in each sieved product resulting from analysis values obtained by dissolving a sample resulting from condensation of each sieved product in an acid and analyzing the sample by an ICP emission spectrometer.

TABLE 1

| Co Concentrate | | | | | | | | | |
|---|---|---|---|---|---|---|---|---|---|
| Recovery Rate (%) | | | | | Content (%) | | | | |
| Co | Ni | Cu | Fe | Al | Co | Ni | Cu | Fe | Al |
| 98 | 4 | 5 | 25 | 12 | 37 | 0.13 | 0.7 | 0.04 | 4.5 |

In Example 1, radiation from the heat source was reduced by placing the lithium ion batteries in the alumina crucible during heating the lithium ion batteries, and further a rapid temperature rise of the sample was avoided by adjusting the output of the heater of the crucible furnace, so that a sufficient gas could flow out from the inside of the housings to prevent rupture of the lithium ion batteries. As a result, it is understood from the results shown in Table 1 that the amount of aluminum in the sieved product was decreased while recovering cobalt with the increased recovery rate.

Example 2

Lithium ion batteries each having an Al housing was heated in a crucible furnace in an air atmosphere. The lithium ion batteries were placed in the alumina crucible such that heat from wires of an electric heater of the crucible furnace was not directly applied to the lithium ion batteries, and the lithium ion batteries were covered with alumina powder. The lithium ion batteries was heated with the maximum output of the heater and heated to 550° C. FIG. 3 graphically shows a history of the sample temperature. For the lithium ion batteries after heating, expansion of the Al housings was observed, but the housings were maintained in their original shapes without rupture of the housings or the like. The lithium ion batteries after the heating treatment were crushed with a crusher, and then sieved with a sieve having openings of 1 mm to recover positive electrode materials and the like below the sieve. The sieved product (<1 mm) had a Co content of 38%, an Al content of 1.8%, and a Cu content of 0.4%, and had a Co recovery rate of 85%. The analytical values and the recovery rates of the sieved product are shown in Table 2.

TABLE 2

| Co Concentrate | | | | | | | | | |
|---|---|---|---|---|---|---|---|---|---|
| Recovery Rate (%) | | | | | Content (%) | | | | |
| Co | Ni | Cu | Fe | Al | Co | Ni | Cu | Fe | Al |
| 85 | 0.4 | 2 | 0 | 7 | 38 | 0.03 | 0.4 | 0.01 | 1.8 |

As can be seen from the results shown in Table 2, in Example 2, radiation from the heat source was reduced by placing the lithium ion batteries in the alumina crucible and further covering the lithium ion batteries with alumina powder when the lithium ion batteries were heated, so that the a rapid temperature rise of the sample could be avoided even though the lithium ion batteries were heated with the maximum output of the heater of the crucible furnace, whereby a sufficient gas could be released from the inside of the housing to prevent rupture of the lithium ion batteries. Also in Example 2, the amount of aluminum in the sieved product could be decreased while recovering cobalt with the high recovery rate.

Example 3

Lithium ion batteries each having an Al housing were placed in a boat made of an iron material and heated in a stationary combustion furnace in an air atmosphere. The lithium ion batteries were placed in the boat such that flames and heat from heavy oil burners of the stationary combustion furnace were not directly applied to the lithium ion batteries, and the lithium ion batteries were covered with alumina powder. FIG. 4 graphically shows a history of the sample temperature. For the lithium ion batteries after heating, expansion of the Al housings was observed, but the housings were maintained in their original shapes without rupture of the housings or the like. The lithium ion batteries after the heating treatment were crushed with a crusher, and then sieved with a sieve having openings of 1 mm to recover positive electrode materials and the like below the sieve. The sieved product (<1 mm) had a Co content of 36%, an Al content of 3.6%, and a Cu content of 1.0%, and had a Co recovery rate of 92%. The analytical values and the recovery rates of the sieved product are shown in Table 3.

TABLE 3

| Sieved Product (<1 mm) | | | | | | | | | |
|---|---|---|---|---|---|---|---|---|---|
| Recovery Rate (%) | | | | | Content (%) | | | | |
| Co | Ni | Cu | Fe | Al | Co | Ni | Cu | Fe | Al |
| 92 | 17 | 6.2 | 2 | 10 | 36 | 1 | 1 | 0.05 | 3.6 |

Comparative Example 1

Lithium ion batteries each having an Al housing were heated in a crucible furnace in an air atmosphere. The lithium ion batteries were heated at the full power of the heating capacity of the electric furnace and then further heated to 550° C. FIG. 5 graphically shows a history of the sample temperature. The sample temperature was sharply increased. The lithium ion batteries after heating were in states where the whole lithium ion batteries were damaged, and for a part of the batteries, the aluminum foil was visible. The lithium ion batteries after the heating treatment were crushed with a crusher, and then sieved with a sieve having openings of 1 mm to recover positive electrode materials and the like below the sieve. The sieved product (<1 mm) had a Co content of 31%, an Al content of 17.0%, and a Cu content of 1.3%, and had a Co recovery rate of 71%. The analytical values and the recovery rates of the sieved product are shown in Table 4.

TABLE 4

| Co Concentrate | | | | | | | | | |
|---|---|---|---|---|---|---|---|---|---|
| Recovery Rate (%) | | | | | Content (%) | | | | |
| Co | Ni | Cu | Fe | Al | Co | Ni | Cu | Fe | Al |
| 71 | 2.0 | 5 | 18 | 26 | 31 | 0.09 | 1.3 | 0.09 | 7.0 |

In Comparative Example 1, the lithium ion batteries would be broken due to the rapid rise of the temperature during the temperature increasing process of the lithium ion batteries, so that most of the aluminum foils in the housings would be oxidized. Accordingly, as can be seen from the results shown in Table 4, the amount of aluminum in the sieved product was increased.

Comparative Example 2

Lithium ion batteries each having an Al housing was placed in a boat made of an iron material and heated in a stationary combustion furnace in an air atmosphere. The lithium ion batteries were placed in the combustion furnace without covering the inside of the boat. As a result, flames of heavy oil burners were applied to the lithium ion batteries when heating them in the stationary combustion furnace. FIG. 6 graphically shows a history of the sample temperature. The sample temperature was sharply increased as the flames of the heavy oil burners of the stationary combustion furnace were directly applied. The lithium ion batteries after heating were in a state where the whole lithium ion batteries were broken or Al was melted. The lithium ion batteries after the heating treatment were crushed with a crusher, and then sieved with a sieve having openings of 1 mm to recover positive electrode materials and the like below the sieve. The sieved product (<1 mm) had a Co content of 23%, an Al content of 4.3%, and a Cu content of 3.9%, and had a Co recovery rate of 37%. The analytical values and the recovery rates of the sieved product are shown in Table 5.

TABLE 5

| Sieved Product (<1 mm) | | | | | | | | | |
|---|---|---|---|---|---|---|---|---|---|
| Recovery Rate (%) | | | | | Content (%) | | | | |
| Co | Ni | Cu | Fe | Al | Co | Ni | Cu | Fe | Al |
| 37 | 4 | 19 | 29 | 31 | 23 | 0.03 | 3.9 | 0.02 | 4.3 |

In Comparative Example 2, the flames of the heavy oil burners were applied to the lithium ion batteries, and the temperature of the lithium ion batteries was sharply increased, so that the lithium ion batteries would be broken and most of aluminum contained therein would be oxidized. Accordingly, as can be seen from the results shown in Table 5, the amount of aluminum in the sieved product was increased.

In view of the foregoing, it is understood that even if the combustion furnace that incinerates a combustion object by flames is used, the rapid temperature rise of the sample can be avoided, and any damage of the aluminum housing and oxidation/embrittlement of the aluminum foil and the copper foil can be inhibited by suppressing heat transfer from the heat source to the lithium ion batteries due to radiation and convection, alternatively or additionally by preventing oxygen from reaching the lithium ion batteries, so that when crushing and sieving the lithium ion batteries after the heating treatment to recover, for example, a sieved product having a particle size of <1 mm, the sieved product containing the positive electrode material components can be recovered with a higher recovery rate and with a lower aluminum content.

DESCRIPTION OF REFERENCE NUMERALS 1 battery protection container
2 gas venting hole
3 bottom
4 filling material
5 lithium ion battery

What is claimed is:

1. A method for treating at least one lithium ion battery enclosed in a housing containing aluminum, comprising:
    heating the lithium ion battery using a combustion furnace in which a combustion object is incinerated by flames, while preventing the flames from being directly applied to the housing of the lithium ion battery, wherein in the combustion furnace, the lithium ion battery is disposed in a battery protection container for preventing the flames from being directly applied to the housing of the lithium ion battery,
    wherein at least one heat insulating material is provided on at least one position on an outer surface of the battery protection container, which position is applied to the flames.

2. The method for treating the lithium ion battery according to claim 1, wherein a temperature of the lithium ion battery in the combustion furnace is increased in an air atmosphere.

3. The method for treating the lithium ion battery according to claim 1, wherein the battery protection container has at least one gas venting hole for discharging a gas flowing out from the inside of the housing of the lithium ion battery to the outside of the battery protection container.

4. The method for treating the lithium ion battery according to claim 1, wherein in the battery protection container, a filling material is arranged together with the lithium ion battery.

5. The method for treating the lithium ion battery according to claim 4, wherein the filling material is in the form of powder.

6. The method for treating the lithium ion battery according to claim 5, wherein the powder is alumina powder.

7. The method for treating the lithium ion battery according to claim 4, wherein in the battery protection container, the entire lithium ion battery is embedded in the filling material.

8. The method for treating the lithium ion battery according to claim 1, wherein after heating the lithium ion battery, the lithium ion battery maintains the state where the lithium ion battery is enclosed in the housing.

9. The method for treating the lithium ion battery according to claim 2, wherein in the combustion furnace, the lithium ion battery is disposed in a battery protection container for preventing the flames from being directly applied to the housing of the lithium ion battery, and the flames are applied to an outer surface of the battery protection container.

10. The method for treating the lithium ion battery according to claim 3, wherein in the battery protection container, a filling material is arranged together with the lithium ion battery.

11. The method for treating the lithium ion battery according to claim 5, wherein in the battery protection container, the entire lithium ion battery is embedded in the filling material.

12. The method for treating the lithium ion battery according to claim 6, wherein in the battery protection container, the entire lithium ion battery is embedded in the filling material.

13. The method for treating the lithium ion battery according to claim 2, wherein after heating the lithium ion battery, the lithium ion battery maintains the state where the lithium ion battery is enclosed in the housing.

* * * * *